Sept. 13, 1932.  E. J. HIRVONEN  1,876,934

BRAKE MECHANISM

Original Filed Jan. 27, 1925

INVENTOR
ERIK J. HIRVONEN
BY
ATTORNEY

Patented Sept. 13, 1932

1,876,934

UNITED STATES PATENT OFFICE

ERIK J. HIRVONEN, OF WORCESTER, MASSACHUSETTS, ASSIGNOR, BY MESNE ASSIGNMENTS, TO BENDIX BRAKE COMPANY, OF SOUTH BEND, INDIANA, A CORPORATION OF ILLINOIS

BRAKE MECHANISM

Original application filed January 27, 1925, Serial No. 5,129. Divided and this application filed April 15, 1929. Serial No. 355,116.

This invention relates to brakes and is illustrated as embodied in an internally expanding brake for an automobile wheel.

An object of this invention is to provide an improved brake mechanism wherein the energy of the rotating brake member may be utilized to increase the braking effect of the mechanism over and above the force exerted by the brake actuating means employed to move the complementary parts of the brake mechanism into braking engagement.

A further object of the invention relates to the provision of brake mechanism so arranged that the braking pressure on the brake drum may be approximately balanced thereby obviating distortion of the drum during the braking operation.

A still further object resides in the provision of a brake wherein the component parts are so constructed and arranged as to insure an even wear on the surfaces thereof and further to obtain a maximum area of such braking surface.

In the preferred embodiment of my invention, I arrange to carry out the aforementioned objects in a construction suitable for light weight cars wherein there is provided a brake comprising four shoes in two pairs, each pair consisting of pivotally connected shoes anchored at one end of one of the shoes, the brake being further characterized by the anchored ends of the respective pairs of shoes overlapping each other. Two juxtaposed anchors are thus provided for two pairs of pivotally connected shoes, the cross anchor construction serving to increase the amount of brake lining contacting the drum.

Various other features, novel combinations of parts and desirable particular constructions will be apparent from the following description of one illustrative embodiment shown in the accompanying drawing, in which.

Figure 1:
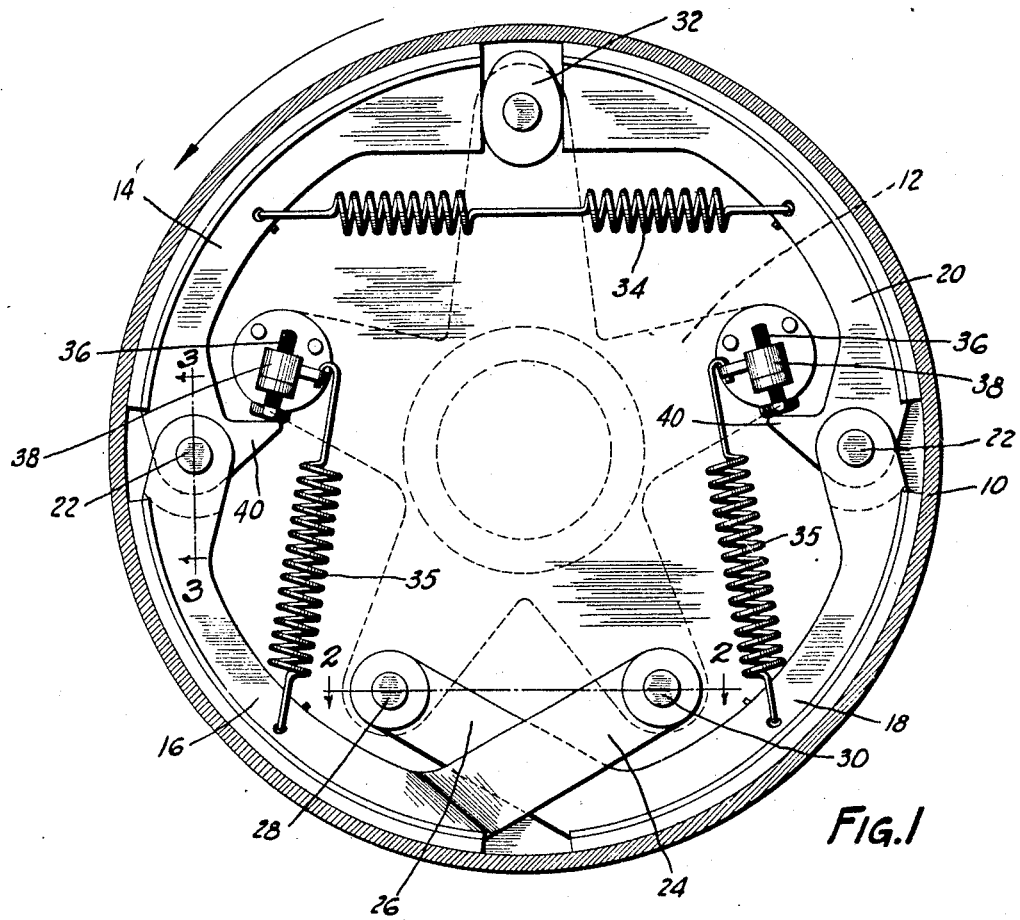
Figure 1 is a vertical section through my novel brake disclosing the brake shoes in side elevation, the section being taken just through the brake drum inside the head thereof.
Figure 2:
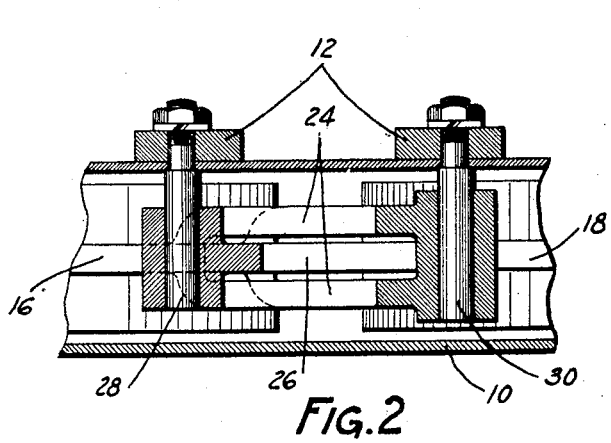
Figure 2 is a section through the anchor members of the brake taken on the line 2—2 of Figure 1.
Figure 3:
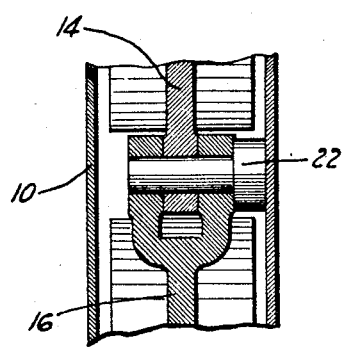
Figure 3 is a section taken on the line 3—3 of Figure 1 disclosing the pivoted connection between each pair of shoes.

As disclosed in the drawing there is provided a rotatable brake drum 10 of the usual construction at the open side of which there is provided a suitable stationary brake support plate 12 shown as a spider member. The principal brake elements are shown enclosed by the drum and spider support and may comprise four brake shoes 14, 16, 18 and 20 each T-shaped in cross section.

According to an important feature of my invention, the four shoes are arranged in two pairs, shoes 14 and 16 being pivotally connected by a floating pivot pin 22 extending through co-linear openings including an opening in the end of shoe 14 and openings in the bifurcated end of shoe 16 which straddles the end of shoe 14. The connection between shoes 18 and 20 is of a similar construction.

The brake is further characterized by the particular cross anchor construction of the sets of shoes wherein shoes 16 and 18 are provided respectively with extensions 24 and 26 to their web portions, extension 24 comprising spaced arms straddling the single extension arm 26 on shoe 18. Both arms 24 and 26 extend upwardly and angularly away from the shoe ends and terminate in boss members through which pass stud bolts 28 and 30 secured to the spider member and which bolts pivotally anchor each set of shoes.

Shoes 14 and 20 which may be designated as Servo shoes of the respective pairs are preferably spaced apart to accommodate a two-lobed actuating cam 32 whose shaft is journaled in one of the arms of the spider support. Cam 32 is rotated to spread the shoes 14 and 20 apart in applying the brake, which movement is counteracted by the return spring 34 connected to each shoe and which spring serves to return the shoes to an inactive position upon release of the cam.

With the drum rotating counterclockwise as indicated by the arrow in Figure 1, shoe 14 is wiped or rotated by the revolving drum thereby actuating shoe 16 connected therewith. The applying action of the cam upon shoe 14 is thus augmented by the energizing action of the rotating drum, the combined effect on the shoe resulting in a greatly increased applying pressure to the secondary shoe 16. Inasmuch as the pairs of shoes are identical in construction and arrangement within the brake, it follows that with clockwise rotation of the drum the action of the shoes 20 and 18 is identical with that just described. The released position of the respective pairs of shoes is determined by the action of return springs 35, in combination with adjustable stops each comprising a screw 36 threaded into a boss 38 on one of the spider arms, the head of each screw contacting a projection 40 on the end of each primary shoe 14 and 20.

By virtue of the cross anchor construction a maximum of brake lining is presented to the drum to be braked and the particular arrangement of the pairs of shoes also insures maximum braking efficiency in both directions of drum rotation.

This application constitutes a division of my co-pending application No. 5,129, filed January 27, 1925.

While an illustrative embodiment of the invention has been described in detail, it is not my intention to limit the scope of the invention to that particular embodiment or otherwise than by the terms of the appended claims.

I claim:

1. A brake comprising a support, two pairs of articulated brake shoes having overlapping extensions pivotally anchored to the support, and stops adjacent the articulations limiting the idle positions of the pairs of shoes.

2. A brake comprising a support, two pairs of articulated brake shoes, one shoe of each pair having an inward extension adjacent its articulated end, and a stop for each shoe secured to the support adapted to contact with the extension and limit the idle position of the shoe.

3. A brake comprising a support, two pairs of articulated brake shoes, one shoe of each pair having an inward extension adjacent its articulated end, and a stop for each shoe secured to the support adapted to contact with the extension and limit the idle position of the shoe, said stop arranged to be moved parallel to the plane of the support for effecting an adjustment.

4. A brake comprising a drum and two pairs of shoes cooperating therewith, each pair comprising a primary shoe and a secondary shoe pivoted thereto to be actuated by the primary shoe, the secondary shoe being provided with an extension overlapping the secondary shoe of the other pair, and an anchor pivotally related to the extension and located in such a position that force exerted by the primary shoe acts at a distance from the anchor of more than the radius of the drum.

5. A brake comprising a support, two pairs of articulated brake shoes having overlapping extensions pivotally anchored to the support, and stops limiting the idle positions of the pairs of shoes.

In testimony whereof, I have hereunto signed my name.

ERIK J. HIRVONEN.